US008387032B1

(12) United States Patent
Goldman et al.

(10) Patent No.: US 8,387,032 B1
(45) Date of Patent: Feb. 26, 2013

(54) CAPTIVE RUNTIME DEPLOYMENT

(75) Inventors: Oliver Goldman, Redwood City, CA (US); Edward R. W. Rowe, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1029 days.

(21) Appl. No.: 12/398,129

(22) Filed: Mar. 4, 2009

(51) Int. Cl.
*G06F 9/44* (2006.01)
*G06F 9/45* (2006.01)
*G06F 9/445* (2006.01)

(52) U.S. Cl. ........ 717/148; 717/110; 717/119; 717/136; 717/164

(58) Field of Classification Search .................. None
See application file for complete search history.

(56) References Cited

U.S. PATENT DOCUMENTS

| 6,154,878 | A | * | 11/2000 | Saboff | 717/173 |
|---|---|---|---|---|---|
| 6,499,137 | B1 | * | 12/2002 | Hunt | 717/164 |
| 7,062,770 | B2 | * | 6/2006 | Limprecht et al. | 719/315 |
| 7,082,600 | B1 | * | 7/2006 | Rau et al. | 717/148 |
| 7,370,318 | B1 | * | 5/2008 | Howe et al. | 717/110 |
| 7,634,762 | B1 | * | 12/2009 | Wheeler et al. | 717/136 |
| 7,913,248 | B1 | | 3/2011 | Lynch et al. | |
| 8,136,100 | B1 | * | 3/2012 | Goldman | 717/136 |
| 8,230,417 | B1 | | 7/2012 | Clark et al. | |
| 2008/0127169 | A1 | | 5/2008 | Malasky et al. | |
| 2008/0127170 | A1 | | 5/2008 | Goldman et al. | |
| 2008/0201568 | A1 | * | 8/2008 | Quinn et al. | 713/1 |
| 2009/0307430 | A1 | * | 12/2009 | Bruening et al. | 711/119 |
| 2012/0159464 | A1 | * | 6/2012 | Demetriou et al. | 717/148 |

FOREIGN PATENT DOCUMENTS

WO 2008154426 12/2008

OTHER PUBLICATIONS

Anderson, Rick, "The End of DLL Hell," Microsoft Corporation, http://msdn.microsoft.com/en-us/library/ms811694(printer).aspx, Mar. 2, 2009, 9 pages.
Halfond et al., "Combining Static Analysis and Runtime Monitoring to Counter SQL-Injection Attacks," Workshop on Dynamic Analysis (WODA 2005), May 17, 2005, St. Louis, MO, USA, 7 pages.
Sunitha et al., "A New Technique for Copy Propagation and Dead Code Elimination Using Hash Based Value Numbering," IEEE Xplore, Downloaded Dec. 18, 2008, 4 pages.
Yu, Hao, "Run-Time Optimization of Adaptive Irregular Applications," A Dissertation submitted to the Office of Graduate Studies of Texas A&M University, Aug. 2004, 121 pages.

* cited by examiner

*Primary Examiner* — Isaac Tecklu
(74) *Attorney, Agent, or Firm* — Fish & Richardson P.C.

(57) ABSTRACT

Methods, systems, and apparatus, including computer programs encoded on computer storage media, for captive runtime deployment. In one aspect, a method performed by data processing apparatus employing a runtime environment includes accessing software code of a software application that relies on a runtime of the runtime environment to operate; selecting a proper subset of the runtime, including sharable library code, based on information associated with the software application; combining the software code and the proper subset of the runtime to form a computer program configured to effect the software application using a version of the runtime captive to the computer program, the captive version of the runtime including the proper subset of the runtime; and storing the computer program on a computer-readable medium coupled with a processor.

23 Claims, 4 Drawing Sheets

CAPTIVE RUNTIME DEPLOYMENT

BACKGROUND

This specification relates to runtime environments. A runtime environment can include a set of software development tools for creating software applications which benefit during execution from a shared runtime and the components included within the shared runtime. A runtime environment is not necessarily platform-specific. For example, a runtime environment may be used to generate individual runtimes appropriate for supporting one or more software applications being executed upon one or more operating system platforms. Examples of runtime environments include the Java Development Kit (JDK), available from Sun Microsystems, Inc. of Santa Clara, Calif. or the .NET Framework available from Microsoft Corp. of Seattle, Wash.

A runtime can be installed upon a computing device to provide software support for processes related to one or more software applications. The runtime can include, for example, one or more software libraries and/or other files (e.g., files including language-specific strings for graphical user interface (GUI) generation). Such software libraries can be shared by different applications, just as traditional software libraries on computer systems. Traditional software library schemes permit the set of locations at which a library is found to be modified, sometimes under the control of the application, the operating system, the computer administrator, or some combination of these. Moreover, traditional software library schemes have also allowed a library to be made captive to the application loading it, and some runtimes can also be deployed in a captive mode (e.g., Eclipse is packaged with a captive copy of Java).

In the case of runtime libraries, the software support provided by the runtime can include dynamic optimization of the application being executed (e.g., GUI generation based upon the size of the display attached to the computing device, etc.), the loading and linking of corollary information required to execute an application (e.g., foreign language libraries, etc.), machine code generation, and/or software execution. The runtime may be platform-specific. For example, the runtime may be generated to include the capability of interfacing with a specific type of operating system to provide services to the software application(s).

Because the runtime can be used to provide services to the software application(s) in lieu of the operating system, the runtime may be referred to as a virtual machine. During execution, a software application may issue commands to the virtual machine rather than the operating system (e.g., for peripheral support, memory management, etc.) and the virtual machine in turn may provide the software support typically provided by an operating system. The virtual machine, in some implementations, may act as a translator between the application executable and the operating system. For example, the software application may be platform-independent, while the virtual machine has platform-specific capabilities.

SUMMARY

This specification describes technologies relating to captive runtime deployment. In general, one innovative aspect of the subject matter described in this specification can be embodied in methods that include the actions of accessing software code of a software application that relies on a runtime of the runtime environment to operate; selecting a proper subset of the runtime, including sharable library code, based on information associated with the software application; combining the software code and the proper subset of the runtime to form a computer program configured to effect the software application using a version of the runtime captive to the computer program, the captive version of the runtime including the proper subset of the runtime; and storing the computer program on a computer-readable medium coupled with a processor. Other embodiments of this aspect include corresponding systems, apparatus, and computer programs, configured to perform the actions of the methods, encoded on computer storage devices.

For example, a system can include a user device, and one or more computers operable to interact with the device and to perform the actions of the methods. The one or more computers can include a server system operable to interact with the device through an enterprise data communication network to provide computer network administration services, the device can be operable to interact with the server as a client; where the system further includes a computer system coupled with the enterprise data communication network and comprising the computer-readable medium coupled with the processor. Alternatively, the one or more computers can consist of one computer, the device being a user interface device, and the one computer including the user interface device.

These and other embodiments can each optionally include one or more of the following features. The selecting can include removing a portion of one or more of multiple runtime libraries and additional files to form the proper subset of the runtime. The combining can include forming a package for the computer program to install the computer program on a computer with the proper subset of the runtime embedded, at least in part, as one or more libraries in an install directory associated with the software application such that the proper subset of the runtime is treated by an operating system of the computer, for purposes of application management, as part of a set of files forming the software application.

The methods can further include accessing the information associated with the software application, where the information includes one or more statements regarding used and unused features of the runtime. The methods can further include: reading the one or more statements regarding used and unused features of the runtime; analyzing the software application to identify a feature that is used despite an indication that the identified feature is unused (and/or to identify a feature that is unused despite an indication that the identified feature is used); notifying a user regarding the identified feature before changing the indication with respect to the identified feature; and changing the indication with respect to the identified feature.

The methods can further include deriving the information associated with the software application by static or instrumented analysis. The combining can include stitching compiled native code of the software application onto the proper subset of the runtime to form the computer program. Moreover, the software application can include a suite of related software application programs, and the selecting can include selecting the proper subset of the runtime based on a union of requirements for the software application programs.

Particular embodiments of the subject matter described in this specification can be implemented so as to realize one or more of the following advantages. A runtime environment can provide runtime tooling including lookup rules and packaging technology that provides an explicit mechanism to bind together an application and a runtime, as two separate inputs, into a combined package as the output. The packaging mechanism can optimize the size of a captive runtime using explicit declarations regarding features of the runtime that are used or not used, which can result in significant size reductions for a captive runtime.

The use of network bandwidth can be reduced for deployments of software applications and runtimes. Storage space requirements for captive runtimes can also be reduced. Runtime dependent software can be installed on more computing devices, including devices that impose restrictions on the use of shared runtimes. A runtime environment can create a more flexible deployment model, allowing different applications to either share or not share a particular pared down version of runtime as needed, which can facilitate administration of updates to runtimes within an enterprise network.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
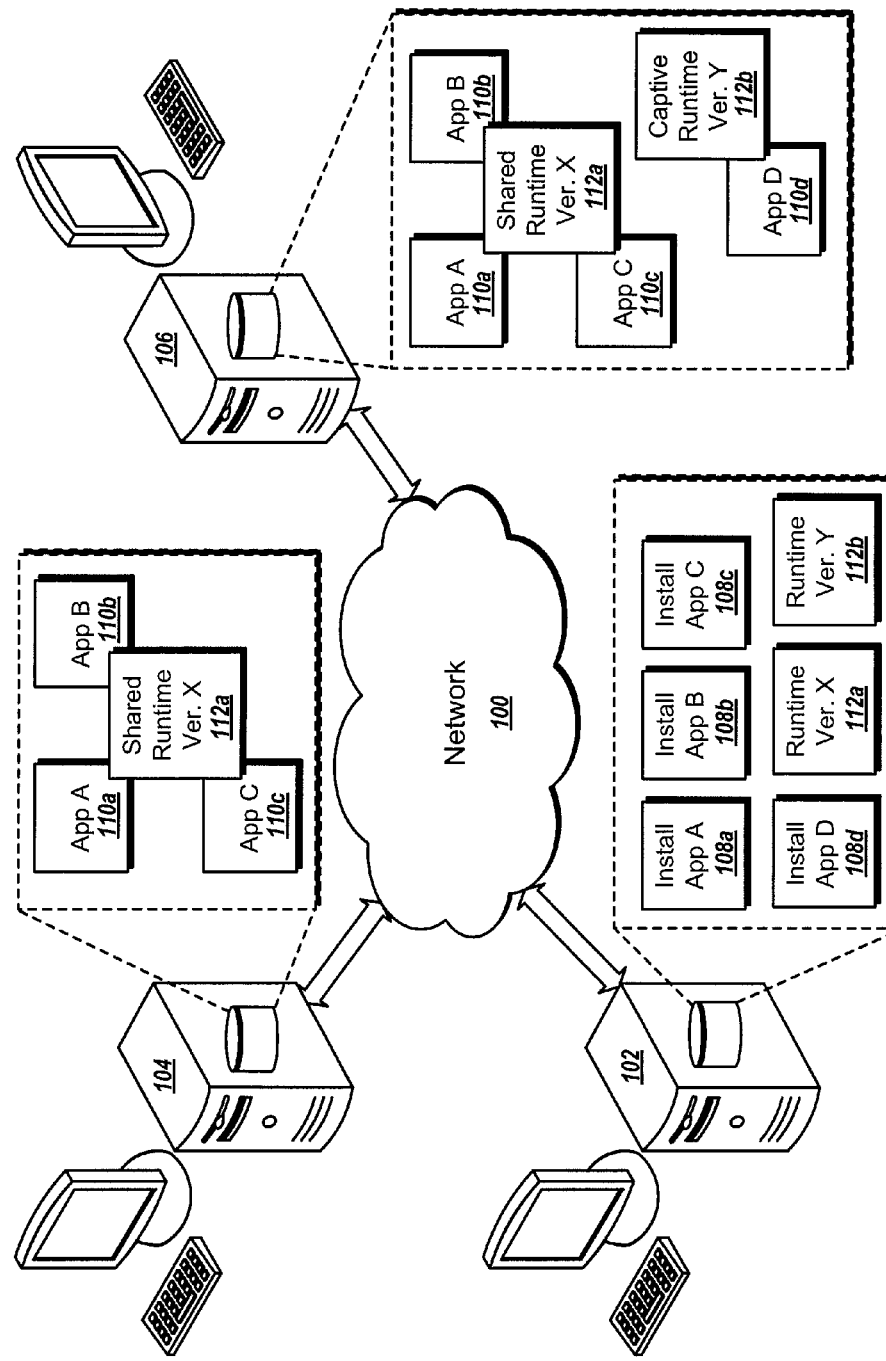
FIG. 1 is a block diagram showing examples of software application deployment through a computer network.

FIG. 1 is a block diagram showing examples of software application deployment through a computer network 100. The computer network 100, in some implementations, may be an enterprise network. For example, an entity having multiple physical locations (e.g., corporation, university, government offices, etc.) can establish an enterprise network to connect otherwise isolated departmental or location networks into a larger enterprise network (e.g., an intranet, a virtual private network operating on a public inter-network, or a combination of these). Benefits of an enterprise network may include user access to shared data and/or computing resources across diverse locations, integrated information technology support, and improved data security and network reliability within the organization.

An enterprise network can be maintained from a central location (e.g., computer system or department). For example, software installation, upgrade, and maintenance of network communications may be handled by an enterprise network administrator. Thus, the computer network 100 can include an administrator computer 102, which can be used to manage one or more enterprise user devices (e.g., a user device 104 and a user device 106). The administrator computer 102, although portrayed as a computing device, may be implemented as a virtual administrative machine (e.g., a server accessed by any number of enterprise computing devices). In some implementations, administrator authentication (e.g., user identification and password) may be used to access an administrative server to provide the administrative services to the user devices connected by the computer network 100.

The user devices connected to the computer network 100 can include a variety of devices, styles, hardware, and software platforms. For example, desktop computers, laptop computers, personal data assistants (PDAs), servers, and/or notebook computers can all be managed by the administrator computer 102 via the computer network 100. The user device 104, for example, may be running a different operating system (OS) and/or a different set of software applications than the user device 106. The user devices may be connected to the computer network 100 using wired or wireless communications techniques. For example, the computer network 100 may be a wireless network connecting any number of mobile user devices (e.g., smart phones, PDAs, etc.). In some implementations, the user device 104 and the user device 106 are dissimilar computing devices. For example, the user device 104 may be a laptop computer while the user device 106 is a desktop computer.

The administrator computer 102 can be used to distribute software installations, upgrades and/or security patches to the user devices 104 and 106. For example, the administrator computer 102 can be used to distribute a first software installation program 108a, a second software installation program 108b, a third software installation program 108c, or a fourth software installation program 108d for installing a first software application 110a, a second software application 110b, a third software application 110c, or a fourth software application 110d on the user device 104 and/or the user device 106. The software installation programs 108, for example, may be delivered to the user devices 104 and 106 through the computer network 100 and executed remotely by the administrator computer 102. In some implementations, different user devices may have a different set of software applications installed. For example, different work groups within the enterprise network 100 may have different software needs (e.g., related to job requirements, etc.). Different versions of the same software application, in some implementations, may be distributed to different user devices. For example, versions of a software application created for different operating systems may be distributed to user devices based upon the operating system of each device.

One or more software applications 110 distributed by the administrator computer 102 may rely on a runtime. A runtime, such as a first runtime version 112a or a second runtime version 112b stored within the administrator computer 102, can be installed upon a user device to provide software support for processes related to one or more of the software applications 110. In some implementations, a software installation program may include a runtime. For example, the software installation program 108d may include the installation of the second runtime version 112b. In other implementations, the runtime version 112b can be installed separately from the software application 110d. When the administrator installs a software application and/or a runtime within the network 100, typically the installation programs are distributed to many user devices. The act of installing the software application and/or runtime, therefore, can utilize considerable network bandwidth.

A single runtime may be shared amongst multiple software applications. For example, the software applications 110a and 110b share the first runtime version 112a as installed on the user device 104. In some implementations, one or more software applications can each have a captive copy of a runtime. For example, the software application 110d installed upon the user device 106 relies upon a captive copy of the second runtime version 112b. The captive copy of the second runtime version 112b is dedicated exclusively to the software application 110d. The captive copy of the second runtime version 112b, in some implementations, may be stored in a separate location from the shared runtime version 112a (e.g., the installation directory of the software application 110*d*). In general, a captive copy of a runtime can include a runtime library deployed in a captive mode, where a copy of the library is stored separately from the usual shared location of that library. One or more software applications which depend upon the captive copy of the library may be redirected to look within the storage location of the captive copy. When a software application using a captive copy of a library is executed (e.g., the software application 110*d*), the information within the captive copy of the library is loaded into memory. Meanwhile, other software applications may be running which use the shared copy of the same library (e.g., the software applications 110*a* and 110*b*).

A runtime may be generated by an administrator when preparing a software installation program. The administrator computer 102 can include a runtime environment which contains a software framework for deployment and, optionally, development of software applications which rely upon a type of runtime. For example, the runtime environment can include a software development kit (SDK) for developing software applications which rely upon a runtime and/or an enterprise administration kit (EAK) for deploying and managing software applications which rely upon a runtime. The runtime environment can further include services (e.g., HTML engine, applet plugins, etc.), software libraries, and other building blocks for generating and/or supporting the execution of a software application.

Using the runtime environment, for example, the administrator may generate a platform-specific (e.g., specific operating system, hardware capabilities, etc.) software application installation program and/or runtime installation program for a platform-independent software application which relies upon a runtime. The runtime environment can include, in some implementations, template executable files for multiple different computer platforms. The template executable files or additional runtime environment files can include directions to install new applications by reading relevant data for an application to populate an appropriate template executable for a platform to make the executable operate as desired, and to place the new application executable into the appropriate install directory (with appropriate renaming based on the application's metadata) on the target platform. Thus, an application developer can program the application entirely in a cross-platform code format (e.g., SWF) and need not create multiple versions of the application's installation package for different computer platforms. In some implementations, multiple versions of a runtime can additionally be generated through the use of a runtime environment, depending upon the capabilities desired.

In one example, the user devices 104 and 106 have the first runtime version 112*a* installed. The software applications 110*a*, 110*b*, and 110*c* share the first runtime version 112*a* during execution on the user devices 104 and 106. If the administrator receives a security fix for the first runtime version 112*a*, the administrator may first want to verify that the upgrade does not negatively impact the execution of any of the software applications 110*a*, 110*b*, or 110*c* which rely upon the first runtime version 112*a*. The administrator may opt to test the execution of each of the software applications 110*a*, 110*b*, and 110*c* with the patched runtime using the administrator computer 102 before distributing the security fix to the user devices. The security fix may only impact a portion of the runtime (e.g., a library or file) which is not used by the third software application 110*c*. There may be no way for the administrator to know this.

In another example, the administrator may receive a new version of the fourth software application 110*d*. The new version of the fourth software application 110*d* may rely upon the second version of the runtime 112*b*. Upgrading the shared runtime installed upon both the user device 104 and the user device 106 may include first validating the performance of each software application 110*a*, 110*b*, 110*c*, and 110*b* with the second runtime version 112*b* as well as validating the performance of the software application 110*d* with the second runtime version 112*b*. Rather than going through the time and effort to validate the performance of the software applications 110*a*, 110*b*, and 110*c* with the second runtime version 112*b*, the administrator may choose to install the new version of the fourth software application 110*d* upon the user device 106 with a captive copy of the second runtime version 112*b*. The software applications 110*a*, 110*b*, and 110*c*, also installed upon the user device 106, may continue to rely upon the first runtime version 112*a*. By installing the captive upgraded version 112*b* of the first runtime version 112*a*, double the amount of storage space upon the user device 106 is now dedicated to storing runtimes.

In some implementations, a runtime environment (e.g., installed upon the administrator computer 102) may provide the opportunity to reduce the contents of a runtime which is targeted for use as a captive runtime to only those elements (e.g., libraries, files, etc.) which are used by a particular software application. For example, the runtime generation process within the runtime environment may include analyzing a software application to determine which elements to include within the runtime. By reducing the size of the runtime, less storage space may be allocated for storing runtimes upon each user device within the network 100. Additionally, a smaller amount of network bandwidth may be used when distributing a reduced runtime to user devices within the network 100.

In some implementations, runtime reduction may be based upon an installation version of a software application rather than a platform-independent version of the software application. For example, the first runtime version 112*a* may be reduced to support the software application 110*a* which is targeted to be installed upon a particular operating system and operated in the English language. In this example, any elements within the runtime which relate to other specific operating systems or other languages may be left out of the reduced runtime.

Although runtime reduction is described in relation to the needs of a software application, the term software application as used herein may refer to a suite (e.g., two or more) of related software programs. Thus, the runtime reduction can be performed with respect to a set of multiple application programs, where the union of the requirements of the multiple application programs are met by the reduced runtime, and this set of application programs can then share a captive copy of that reduced runtime. Moreover, although many details are described above in connection with an enterprise network, it will be appreciated that other software deployment contexts are also possible, including deployment through other types of networks or through readily transportable media, such as external hard disk drives, flash drives, compact discs (CDs), digital versatile discs (DVDs), etc.

Figure 2:
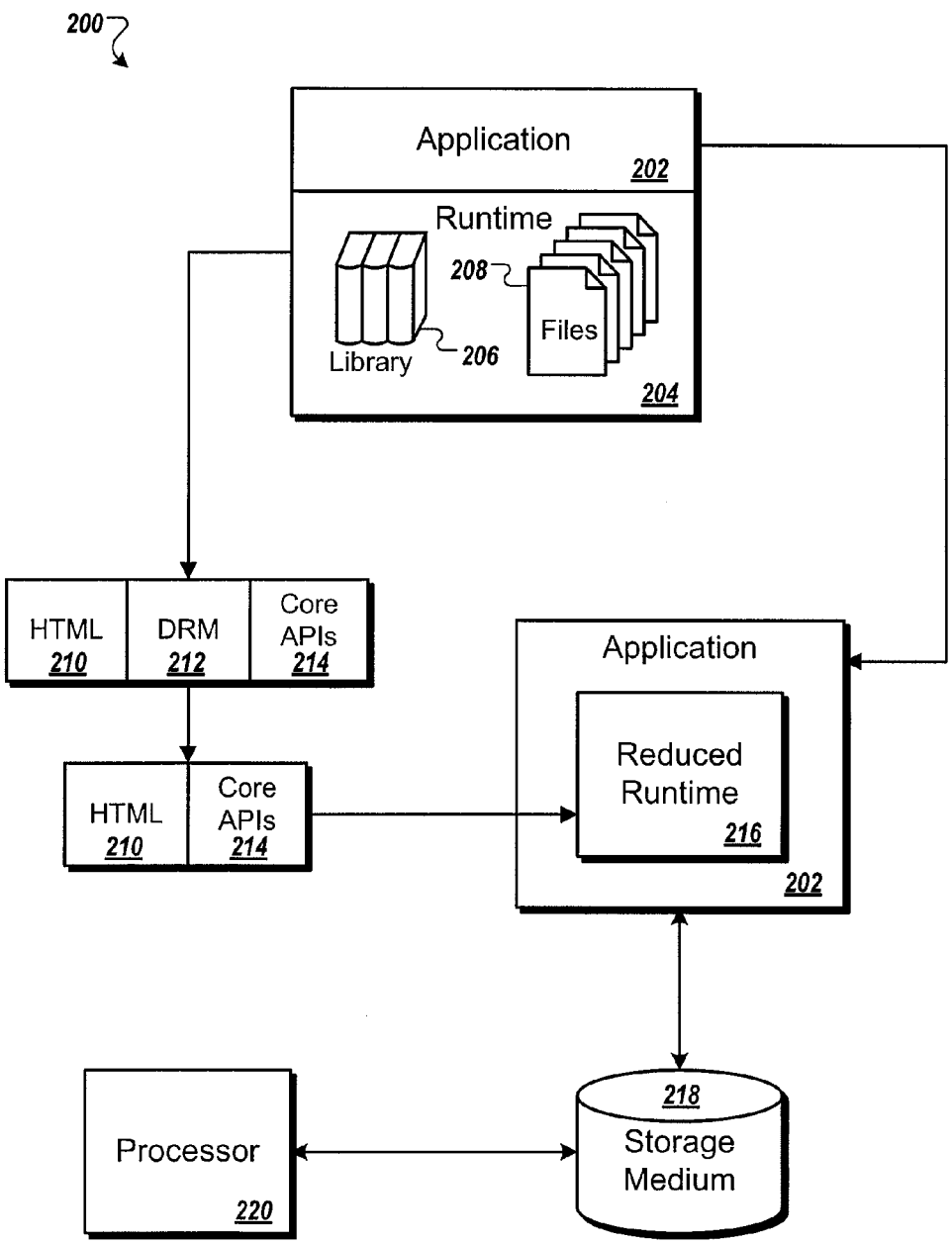
FIG. 2 is a block diagram showing an example of runtime reduction in a captive runtime deployment.

FIG. 2 is a block diagram showing an exemplary system 200 for runtime reduction in a captive runtime deployment. A software application 202 operates upon a runtime 204 during execution. The runtime 204 includes both a set of libraries 206 and a set of additional files 208. The software application 202 may take advantage of only a portion of the libraries 206 and/or additional files 208 included within the runtime 204.

In one example, the runtime 204 may include three major segments: a HyperText Markup Language (HTML) engine 210, a Digital Rights Management (DRM) engine 212, and a set of core application programming interfaces (APIs) 214. The software application 202 may not make use of the DRM engine 212. A reduced runtime 216 can be customized for the needs of the software application 202, for example by removing the DRM 212 from the runtime 204. In some implementations, an administrator generates the reduced runtime 216 by analyzing the software application 202 within a runtime environment.

The reduced runtime 216 can then be bundled with the software application 202. In some implementations, the reduced runtime 216 and the software application 202 are combined within a single software installation program. The software application installation program can be modified, for example, to cause the software application 202 to point to a captive copy of the reduced runtime 216 rather than the location of a shared runtime.

The software application 202 and the reduced runtime 216 are stored within a storage medium 218 which is coupled to a processor 220. The storage medium 218, in some examples, may be an internal hard drive of a computing device, an external hard drive, or a networked storage drive accessible to the computing device which houses the processor 220.

In some implementations, the storage medium 218 may be a portable storage format such as a CD or DVD. For example, after generating the reduced runtime 216, the software application 202 and the reduced runtime 216 (and, optionally, an installation program for installing the software application 202 and the reduced runtime 216) can be transferred to a CD or DVD. The CD or DVD may then be disconnected from the processor 220 and distributed. In other implementations, the processor 220 may be coupled to a network (e.g., the enterprise network 100 as described in FIG. 1 for distribution of the software application 202 and the reduced runtime 216.

In another example, the storage medium 218 includes a facility (e.g., a runtime environment) for generating reduced runtimes based upon the particular runtime elements used by an individual software application. The facility may be executed upon the processor 220 to examine the software application 202, for example to determine whether the software application 202 depends upon individual portions of the runtime 204 (e.g., the HTML engine 202, the DRM engine 212, or the core APIs 214). By executing the facility upon the processor 220, an administrator can generate the reduced runtime 216 for use with the software application 202. The reduced runtime 216 can then be embedded within the software application 202 or otherwise bundled with the software application 202 for deployment.

In general, packaging a captive runtime with an application can be performed by the software developer or later by a third party, such as a computer administrator. The same application can be rebound to a different captive copy of the runtime. Moreover, the input to the process can be a cross-platform package, such as an .air file (available from Adobe Systems Incorporated of San Jose, Calif.).

In some implementations, the software application 202 includes multiple files. The software application 202, for example, may include a runtime dependency file listing the individual dependencies that the software application 202 has with the runtime 204. The software developer, for example, may generate the runtime dependency file. In another example, the runtime dependencies may be included within metadata of the software application 202. The runtime dependencies may be modified, in some implementations, by an administrator. For example, the administrator may specify a desired language, operating system, etc. which may in turn reduce the runtime dependencies.

In some implementations, the facility for generating reduced runtimes may include static analysis of the source code of the software application 202 to determine which aspects of the runtime 204 are being called within the code. For example, static analysis can be used instead of, or in addition to, a runtime dependency listing to determine which elements of the runtime 204 may be discarded when generating a reduced runtime.

Figure 3:
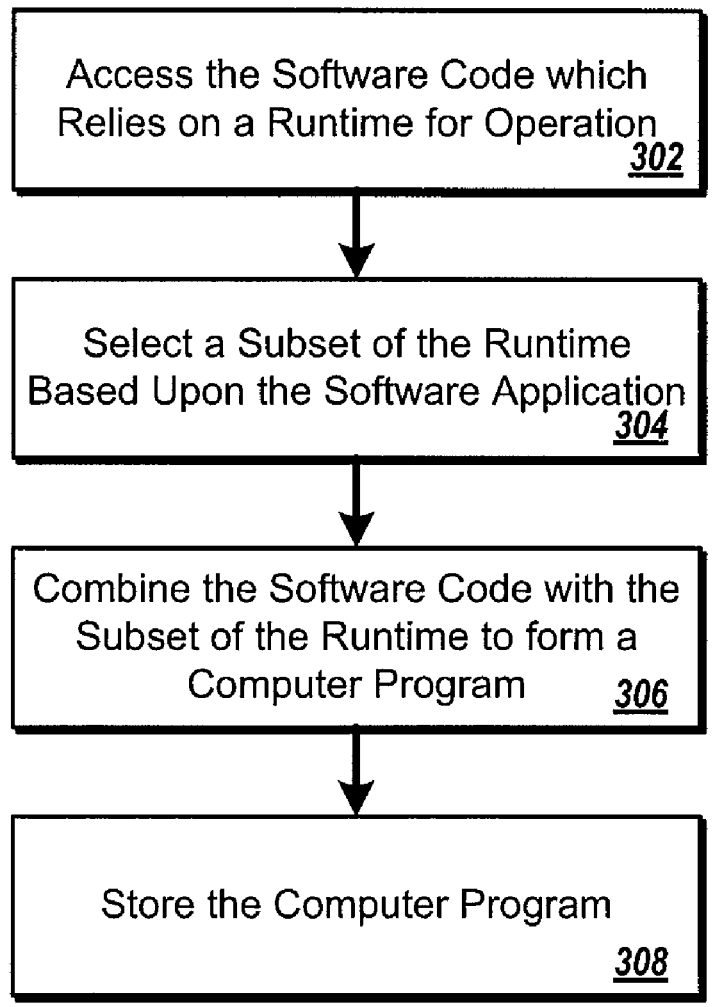
FIG. 3 is a flowchart showing an example process of paring down a runtime for captive runtime deployment.

FIG. 3 is a flowchart showing an example process 300 of paring down a runtime for captive runtime deployment. The process 300, for example, may be used to generate the reduced runtime 216 from the runtime 204 based upon the software application 202, as described in FIG. 2. The process 300 begins with accessing 302 the software code which relies on a runtime for operation. The software code, for example, may be stored upon a portable or permanent storage medium such as an internal hard drive, peripheral hard drive, networked hard drive, CD, DVD, Universal Serial Bus (USB) Flash drive, or other storage medium coupled to a processor within a computing device. The software code, in some examples, may be in the form of a compiled executable, a software application installation program, native machine code, and/or programming language code. In some implementations, the software code includes two or more files. For example, the software code may include a software application and a runtime dependency listing.

A proper subset of a runtime is selected 304 based upon information associated with the software application. The phrase "proper subset" is used in the mathematical sense in that a subset of the elements of the runtime is selected, where this subset contains less than all the elements of the runtime. The runtime, for example, can include multiple software libraries, an HTML engine, a DRM engine, various APIs, and/or other files which support the functionality of the software application and are sharable among many software applications outside of a captive deployment. One or more of the various elements within the runtime may not be utilized by the particular software application. If the software application does not depend upon a particular library or a particular file (e.g., a file of locales for a French language version of the software application), the library or file can be removed from the runtime. In some implementations, information can be removed from within a particular library or a particular file. For example, upon creation of a reduced runtime, only those elements depended upon may remain within a pared down library or file.

The information associated with the software application represents the runtime dependencies for the software application, such as discussed above, and can be stored in various formats and locations. For example, the associated information can be stored in an eXtensible Markup Language (XML) file. The associated information can be stored within or separate from the software application, generated or derived as needed (e.g., via static analysis or instrumented analysis), or some combination of these. Runtime dependencies, in some examples, can be determined using static analysis of the application code or the compiled output of the application code, a developer-created listing of runtime dependencies, an administrator-created listing of runtime dependencies, and/or declarations by the developer embedded within the software code. For example, a static analysis tool may be used to locate references to symbols (e.g., within the application code or the compiled output of the application code) that are included within one or more runtime features. In some implementations, runtime dependencies can be determined using instrumented analysis of the application code. For example, the application may be executed, under user or automated control, while a program associated with the runtime environment records which elements of the runtime the application uses. In one example, calls to software methods associated with one or more runtime features may be intercepted and logged by an instrumented analysis tool. Execution of the application may be simulated, in another example, while noting calls made to elements within the runtime. Moreover, the runtime dependencies can be represented by the associated information either positively (e.g., declaration(s) or a listing of runtime elements that are used by the software application) or negatively (e.g., declaration(s) or a listing of runtime elements that are not used by the software application and are thus eligible for discarding).

The software code is combined 306 with the proper subset of the runtime to form a computer program. The combined software code and runtime is configured such that, during execution, the software application relies upon the reduced version of the runtime which is captive to the software application. For example, the method by which the application locates, at launch time, a runtime it depends on can be altered to include looking for a copy of the runtime embedded within the application itself (e.g., as a .dll in the application's own install directory). Thus, to find the captive runtime, the application can determine its own location on disk and then check for a copy of the runtime in a location relative to its own; for example, on a computer running a Mac® operating system, the application can check inside the Frameworks directory in its own application bundle. Additionally, in some implementations, the reduced version of the runtime may be configured to be upgraded or uninstalled in tandem with the software application, such that the reduced version of the runtime may only be modified or removed through a facility associated with the software application (e.g., through the Add-Remove Programs feature for the software application on a computer running a WINDOWS® operating system).

In some implementations, the directory path for the runtime may reference a location specific to the software application (e.g., an application sub-directory or an application specific sub-directory of the standard runtime installation path, etc.). For example, the software code and runtime may be combined within a software installation program including a portion of the reduced runtime embedded within an install directory associated with the software application. In other implementations, during the generation of the reduced runtime, transformations may be applied which combine one or more elements of the reduced runtime with the software application executable. For example, rather than copying one or more runtime libraries as a library, the library information may be combined with the template executable created for the application. Alternatively, the native code of the compiled software application may be stitched onto a runtime library.

The computer program generated by combining the software code with the proper subset of the runtime, in some implementations, forms a software application installation package. For example, the computer program may be a platform-specific Microsoft Installer (MSI) file for installation upon a computing device configured with a version of the WrNDows® operating system (available from Microsoft Corp. of Redmond, Wash.), e.g., an MSI file can be modified either at the time of its creation, or afterwards in a post-processing operation, to also contain the files and associated metadata for the captive runtime. In other implementations, the computer program may include an executable that is ready to run once saved on a computing system, such as a computing device running a Mac® operating system (available from Apple Inc. of Cupertino, Calif.). Moreover, the computer program generated may be a single software application executable which includes embedded runtime facilities.

The computer program is stored 308 on a computer-readable medium coupled with a processor. In some implementations, the computer program is stored on an internal hard drive of a computing device, an external hard drive, or a networked storage drive accessible to the computing device which houses the processor. In other implementations, the computer program is stored on a portable computer-readable medium such as, for example, a CD, DVD, or USB Flash drive. The portable medium may then be disconnected from the processor and distributed.

Figure 4:
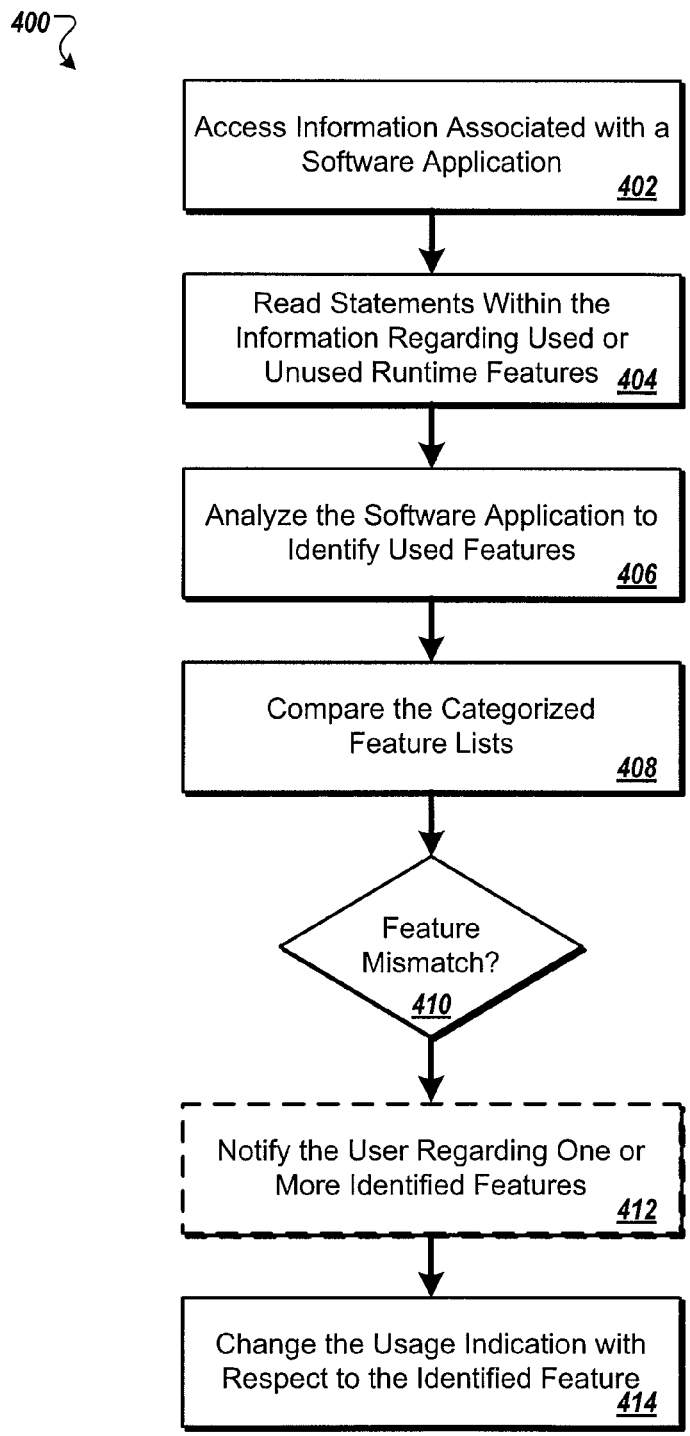
FIG. 4 is a flowchart showing an example process of determining which portions of a runtime can be eliminated for a captive runtime deployment.

FIG. 4 is a flowchart showing an example process 400 of determining which portions of a runtime can be eliminated for a captive runtime deployment. The process 400, for example, may be used to generate the list of features to include within the reduced runtime 216 based upon the software application 202, as described in FIG. 2. In some implementations, the process 400 may be executed by a software developer or enterprise network administrator within a runtime environment. For example, the runtime environment may include a facility (e.g., software application with graphical user interface, etc.) for generating a reduced runtime for captive use with a software application.

The process 400 begins with accessing 402 information associated with a software application. The information, in some examples, may include the software code or additional files associated with the software application. The information, in some examples, may be stored upon a portable or permanent storage medium such as an internal hard drive, peripheral hard drive, networked hard drive, CD, DVD, USB Flash drive, or other storage medium coupled to a processor within a computing device. The software code, in some examples, may be in the form of a compiled executable, a software application installation program, native machine code, and/or programming language code.

One or more statements are read 404 within the information regarding used or unused runtime features. The information, in some implementations, may include statement(s) created by the developer during the development of the software application. In some examples, the information may include a list of runtime features depended upon by the software application, a list of runtime features not used by the software application, and/or declaratory statements embedded within the software code regarding the use of runtime features by the software application. If, for example, the information includes a list of features depended upon by the software application, it may be inferred that any feature not listed is not used by the software application. In some implementations, the information may include statements regarding the type of deployment planned for the software application. For example, if the software application is going to be deployed upon a particular operating system to be used with a particular language, it could be inferred that portions of the runtime supporting other operating systems and/or languages are not needed. In this way, each feature of the runtime may be categorized as being used or not used by the software application.

After having categorized the runtime features based upon the statement(s) read from within the information, the software application is analyzed 406 to identify/confirm runtime dependencies. For example, static analysis may be run against the software code to determine which portions of the runtime are called. The analysis, for example, may occur at the symbol level rather than the library or file level, such that the analyzing tool further maps each symbol access to an associated library or file. A portion of the auto-discovery of the runtime dependencies, in some implementations, may occur during the compilation of the software application. For example, the software application may be compiled to run upon a particular operating system or targeted for use in a particular language, removing dependencies to libraries or files associated with other languages or operating systems.

The feature categories obtained through reading the statement(s) within the information associated with the software applications are compared 408 to the feature categories obtained through analyzing the software application. The features are verified to be categorized identically through both methods.

If one or more features are identified 410 as being categorized differently through code analysis versus statements embedded within the software application, the user may optionally be notified 412 regarding the identified feature(s). For example, within an analyzing tool, a message may be displayed for the user indicating which feature(s) are mismatched between the statement(s) and the code analysis. The user may then be provided the opportunity to select whether to include each feature in a used or unused category. If the user is the software developer, the developer may instead choose to modify the software code. For example, the software developer may remove reference to a feature so that it is properly identified as an unused feature, which need not be included within the reduced runtime.

The usage indication is updated 414 with respect to each identified feature. In one example, the usage indication in question may be reconciled by the user (e.g., through a GUI). In other implementations, the usage indication may be reconciled automatically. For example, if static analysis determines that the application depends upon a runtime feature, even though the statement(s) indicate that the feature is not in use, the usage indication may default to the used category. In another example, if static analysis determines that the application does not use a particular runtime feature, even though the statement(s) indicate that the application depends upon the runtime feature, the usage indication may default to the unused category. In some implementations, default rulings may be a user-applied setting to the software analysis tool (e.g., always reconciled to used, always default to the category derived through static analysis of the code, always default to the category derived through statement analysis, etc.).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by to way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide, for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results.

What is claimed is:

1. A method performed by data processing apparatus comprising:
   accessing software code of a software application that relies on a runtime of a runtime environment to operate;
   selecting a proper subset of the runtime, including sharable library code, based on information associated with the software application;
   combining the software code and the proper subset of the runtime to form a computer program configured to effect the software application using a version of the runtime captive to the computer program, the captive version of the runtime comprising the proper subset of the runtime; and
   storing the computer program on a computer-readable medium coupled with a processor;
   wherein the selecting comprises removing a portion of one or more of multiple runtime libraries and additional files to form the proper subset of the runtime, and the captive version of the runtime is dedicated exclusively to the software application.

2. The method of claim 1, where the combining comprises forming a package for the computer program to install the computer program on a computer with the proper subset of the runtime embedded, at least in part, as one or more libraries in an install directory associated with the software application such that the proper subset of the runtime is treated by an operating system of the computer, for purposes of application management, as part of a set of files forming the software application.

3. The method of claim 1, further comprising accessing the information associated with the software application, where the information comprises one or more statements regarding used and unused features of the runtime.

4. The method of claim 3, further comprising:
   reading the one or more statements regarding used and unused features of the runtime;
   analyzing the software application to identify a feature that is used despite an indication that the identified feature is unused;
   notifying a user regarding the identified feature before changing the indication with respect to the identified feature; and
   changing the indication with respect to the identified feature.

5. The method of claim 1, further comprising deriving the information associated with the software application by static or instrumented analysis, and wherein the accessing, the selecting, the combining and the storing are performed by the runtime environment.

6. The method of claim 1, wherein the combining comprises stitching compiled native code of the software application onto the proper subset of the runtime to form the computer program.

7. The method of claim 1, wherein the software application comprises a suite of related software application programs, and the selecting comprises selecting the proper subset of the runtime based on a union of requirements for the software application programs.

8. A computer storage medium encoded with a computer program, the program comprising instructions that when executed by data processing apparatus cause the data processing apparatus to perform operations comprising:

accessing software code of a software application that relies on a runtime of a runtime environment to operate;
 selecting a proper subset of the runtime, including sharable library code, based on information associated with the software application;
 combining the software code and the proper subset of the runtime to form a computer program configured to effect the software application using a version of the runtime captive to the computer program, the captive version of the runtime comprising the proper subset of the runtime; and
 storing the computer program on a computer-readable medium coupled with a processor;
 wherein the selecting comprises removing a portion of one or more of multiple runtime libraries and additional files to form the proper subset of the runtime, and the captive version of the runtime is dedicated exclusively to the software application.

9. The computer storage medium of claim 8, where the combining comprises forming a package for the computer program to install the computer program on a computer with the proper subset of the runtime embedded, at least in part, as one or more libraries in an install directory associated with the software application such that the proper subset of the runtime is treated by an operating system of the computer, for purposes of application management, as part of a set of files forming the software application.

10. The computer storage medium of claim 8, where the operations further comprise accessing the information associated with the software application, where the information comprises one or more statements regarding used and unused features of the runtime.

11. The computer storage medium of claim 10, where the operations further comprise:

reading the one or more statements regarding used and unused features of the runtime;
 analyzing the software application to identify a feature that is used despite an indication that the identified feature is unused;
 notifying a user regarding the identified feature before changing the indication with respect to the identified feature; and
 changing the indication with respect to the identified feature.

12. The computer storage medium of claim 8, where the operations further comprise deriving the information associated with the software application by static or instrumented analysis, and wherein the accessing, the selecting, the combining and the storing are performed by the runtime environment.

13. The computer storage medium of claim 8, wherein the combining comprises stitching compiled native code of the software application onto the proper subset of the runtime to form the computer program.

14. The computer storage medium of claim 8, wherein the software application comprises a suite of related software application programs, and the selecting comprises selecting the proper subset of the runtime based on a union of requirements for the software application programs.

15. A system comprising:

a user device; and
 one or more computers operable to interact with the device and to perform operations comprising:
  accessing software code of a software application that relies on a runtime of a runtime environment to operate;
  selecting a proper subset of the runtime, including sharable library code, based on information associated with the software application;
  combining the software code and the proper subset of the runtime to form a computer program configured to effect the software application using a version of the runtime captive to the computer program, the captive version of the runtime comprising the proper subset of the runtime; and
  storing the computer program on a computer-readable medium coupled with a processor;
  wherein the selecting comprises removing a portion of one or more of multiple runtime libraries and additional files to form the proper subset of the runtime, and the captive version of the runtime is dedicated exclusively to the software application.

16. The system of claim 15, where the combining comprises forming a package for the computer program to install the computer program on a computer with the proper subset of the runtime embedded, at least in part, as one or more libraries in an install directory associated with the software application such that the proper subset of the runtime is treated by an operating system of the computer, for purposes of application management, as part of a set of files forming the software application.

17. The system of claim 15, where the operations further comprise accessing the information associated with the software application, where the information comprises one or more statements regarding used and unused features of the runtime.

18. The system of claim 17, where the operations further comprise:

reading the one or more statements regarding used and unused features of the runtime;
 analyzing the software application to identify a feature that is used despite an indication that the identified feature is unused;
 notifying a user regarding the identified feature before changing the indication with respect to the identified feature; and
 changing the indication with respect to the identified feature.

19. The system of claim 15, where the operations further comprise deriving the information associated with the software application by static or instrumented analysis, and wherein the accessing, the selecting, the combining and the storing are performed by the runtime environment.

20. The system of claim 15, wherein the combining comprises stitching compiled native code of the software application onto the proper subset of the runtime to form the computer program.

21. The system of claim 15, wherein the software application comprises a suite of related software application programs, and the selecting comprises selecting the proper subset of the runtime based on a union of requirements for the software application programs.

22. The system of claim 15, wherein the one or more computers comprise a server system operable to interact with the device through an enterprise data communication network to provide computer network administration services, and the device is operable to interact with the server as a client; the system further comprising a computer system coupled with the enterprise data communication network and comprising the computer-readable medium coupled with the processor.

23. The system of claim 15, wherein the one or more computers consist of one computer, the device is a user interface device, and the one computer comprises the user interface device.

* * * * *